United States Patent [19]

Decroly et al.

[11] Patent Number: 4,659,625

[45] Date of Patent: Apr. 21, 1987

[54] POLYMERIC MULTILAYER STRUCTURES INCORPORATING A LAYER OF VINYL FLUORIDE OR VINYLIDENE FLUORIDE POLYMER WHICH IS BONDED TO A POLAR POLYMER LAYER

[75] Inventors: Pierre Decroly, Rhode-Saint-Genèse; Claude Dehennau, Waterloo, both of Belgium

[73] Assignee: Solvay & Cie., Brussels, Belgium

[21] Appl. No.: 724,106

[22] Filed: Apr. 17, 1985

[30] Foreign Application Priority Data

Apr. 19, 1984 [FR] France ............................... 84 06372

[51] Int. Cl.[4] ...................... B32B 27/08; B32B 27/36
[52] U.S. Cl. ................................... 428/412; 428/421;
428/424.4; 428/424.6; 428/476.1; 428/518;
428/519; 428/520; 264/176.1
[58] Field of Search .................... 428/412, 421, 424.4,
428/424.6, 476.1, 518, 519, 520

[56] References Cited

U.S. PATENT DOCUMENTS

| | | | |
|---|---|---|---|
| 3,908,070 | 9/1975 | Marzolf | 428/474 |
| 4,161,562 | 7/1979 | Yoshikawa et al. | 428/520 |
| 4,275,099 | 6/1981 | Dani | 428/424.4 X |
| 4,416,946 | 11/1983 | Bolt | 428/421 |

FOREIGN PATENT DOCUMENTS 0060421 9/1982 European Pat. Off. .

*Primary Examiner*—P. C. Ives
*Attorney, Agent, or Firm*—Spencer & Frank

[57] ABSTRACT

Polymeric multilayer structures incorporating a layer made of vinyl fluoride or vinylidene fluoride polymer which is bonded to a polar polymer layer with the use of a vinyl acetate polymer. The polymeric multilayer structures may be in the form of films, sheets, plates, pipes or hollow bodies which can be employed in particular in the field of protection against corrosion or ultraviolet rays.

12 Claims, No Drawings

POLYMERIC MULTILAYER STRUCTURES INCORPORATING A LAYER OF VINYL FLUORIDE OR VINYLIDENE FLUORIDE POLYMER WHICH IS BONDED TO A POLAR POLYMER LAYER

BACKGROUND OF THE INVENTION

1. Field of the Invention

The present invention relates to polymeric multilayer structures incorporating a layer of vinyl fluoride or vinylidene fluoride polymer bonded to a polar polymer layer and more particularly such multilayer structures in which the vinyl fluoride or vinylidene fluoride polymer is bonded to the polar polymer with the use of a polymeric adhesive.

2. Discussion of the Art

Vinyl fluoride polymers and vinylidene fluoride polymers are thermoplastic polymers which have a combination of useful properties and, especially, high chemical inertness and outstanding resistance to weather and to ultraviolet rays. As a result, they find many applications in a great variety of fields and, in particular, in protection against corrosion of ultraviolet rays. However, they have the disadvantage of being relatively costly, which probably restricts their outlets. A suitable means of reducing the cost of articles fabricated of a vinyl fluoride or vinylidene fluoride polymer consists in employing these polymers in the form of polymeric multilayer structures (films, sheets, plates, pipes, hollow bodies, and the like) in which they are combined with other polymers which, furthermore, contribute their own properties and advantages such as, for example, mechanical strength, sealability, impermeability, scratch resistance and the like. However, the abovementioned fluorine-containing polymers adhere very poorly to other polymers, with the result that it is generally necessary to make use of adhesives, which are in most cases polymeric, to ensure adhesive bonding between the fluorine-containing polymers and other polymers.

In French Patent No. FR-A-1,484,153 (The Dow Chemical Co.), it is recommended to bond a polyolefin layer to a fluorinated hydrocarbon polymer layer with the use of a polymeric adhesive consisting, preferably, of a copolymer of ethylene and vinyl acetate containing from approximately 13 to 35% by weight of vinyl acetate.

It has now been found that the use of such copolymers of ethylene and vinyl acetate to bond not a polyolefin but a polar polymer to a polymer of a fluorinated hydrocarbon, such as vinyl fluoride or vinylidene fluoride, gives multilayer complexes which are sensitive to delamination in the region of the fluorine-containing polymer layer.

SUMMARY OF THE INVENTION

The present invention aims to provide polymeric multilayer structures incorporating a layer of vinyl fluoride or vinylidene fluoride polymer, which is bonded to a polar polymer layer which do not have the abovementioned disadvantage.

To this end, the invention provides polymeric multilayer structures incorporating a layer of vinyl fluoride or vinylidene fluoride polymer which is bonded to a polar polymer layer with the use of a vinyl acetate polymer.

DESCRIPTION OF THE PREFERRED EMBODIMENTS

The term polymeric multilayer structures incorporating a layer made of a vinyl fluoride or vinylidene fluoride polymer which is bonded to a polar polymer layer is intended to denote multilayer structures containing at least one layer made of a vinyl fluoride or vinylidene fluoride polymer which is bonded to at least one polar polymer layer. The polymeric multilayer structures according to the invention can thus contain one or more layers made of a vinyl fluoride or vinylidene fluoride polymer which are bonded to one or more polar polymer layers, these layers being themselves capable of being bonded to other polymer layers.

It has been found that, in contrast to the copolymers of ethylene and vinyl acetate which are recommended in the prior art, vinyl acetate polymers adhere perfectly to vinyl fluoride and vinylidene fluoride polymers. Furthermore, the said vinyl acetate polymers adhere perfectly to polar polymers.

The invention thus lies substantially in the use of a vinyl acetate polymer to bond and cause to adhere a layer made of a vinyl fluoride or vinylidene fluoride polymer to a polar polymer layer in the production of multilayer structures.

The term vinyl acetate polymer is intended to denote both the homopolymer and the binary copolymers of vinyl acetate and ethylene containing at least 50% by weight of vinyl acetate. The best results are obtained with binary copolymers of vinyl acetate and ethylene containing from 60 to 90% by weight of vinyl acetate and, still more particularly, with those containing from 70 to 85% by weight of vinyl acetate which are, consequently, preferred.

The vinyl acetate polymers, homopolymers and copolymers with ethylene, are polymers which are well known in themselves. They can be manufactured by any of the conventional methods of polymerisation of ethylenically unsaturated monomers. They are usually maanufactured by aqueous emulsion polymerisation.

The vinyl acetate polymers as defined above are polymers which are more or less sticky and, consequently, difficult to use. To overcome this disadvantage it is particularly advantageous to employ a vinyl acetate polymer coated with a thermoplastic polymer. According to a particularly preferred embodiment of the invention, use is therefore made of a vinyl acetate polymer coated with a thermoplastic polymer. As examples of such thermoplastic polymers, mention may be made of vinyl fluoride or vinyllidene fluoride polymers and vinyl chloride polymers. A particularly preferred thermoplastic coating polymer is polyvinyl chloride. The thermoplastic coating polymer is generally present in a proportion of at most approximately 10% by weight of the coated acetate polymer.

Coating of the vinyl acetate polymer with a thermoplastic polymer may be carried out, for example, by addition of a vinyl acetate polymer latex to a thermoplastic polymer latex and coagulation of the mixture, for example by adding an electrolyte.

The term vinyl fluoride or vinylidene fluoride polymer is intended to denote any polymers containing at least 85 mole % and, preferably, at least 90 mole % of monomer units derived from vinyl fluoride or vinylidene fluoride respectively. The vinyl fluoride or vinylidene fluoride polymers which are suitable for the production of multilayer structures according to the invention thus include both vinyl fluoride and vinylidene fluoride homopolymers and the vinyl fluoride or vinylidene fluoride copolymers containing monomer units derived from one or more comonomers. Preference is given to the polymers containing at least 90 mole % of monomer units derived from vinyl fluoride or vinylidene fluoride respectively, the remainder, where applicable, consisting preferably of monomer units derived from other fluoroolefins, such as vinylidene fluoride, vinyl fluoride, trifluoroethylene, chlorotrifluoroethylene, tetrafluoroethylene and hexafluoropropylene. Particularly preferred fluorine-containing polymers are vinyl fluoride homopolymer and vinylidene fluoride homopolymer and, still more particularly, vinylidene fluoride homopolymer.

The term polar polymer is intended to denote the thermoplastic, elastomeric and thermosetting polymers resulting from polymerisation by polyaddition or by polycondensation which have a permanent dipole moment or, in other words, which contain dipole groups in their molecule. As examples of such polar polymers mention may be made of halogenated polymers such as vinyl chloride, vinylidene chloride and vinyl bromide polymers (homo- and copolymers), polymers containing nitrile groups such as polyacrylonitrile and acrylonitrile/styrene copolymers, cellulose-based polymers, polyketones, both aliphatic and aromatic polyesters, such as methyl or ethyl polyacrylates and polymethacrylates and polyethylene terephthalate, vinyl alcohol/ethylene copolymers (that is to say, vinyl acetate/ethylene copolymers in which at least 90% of the acetate groups have been converted by hydrolysis or alcoholysis into hydroxy groups), aromatic polycarbonates, polyamides or nylons and polyurethanes, which are all, moreover, well-known polymers.

Preferred polar polymers are polyvinyl chloride, vinylidene chloride copolymers, vinyl alcohol/ethylene copolymers, polyethylene terephthalate, polymethyl methacrylate, aromatic polycarbonates derived from bisphenol A, nylons 6 and 66 and polyurethanes.

Particularly preferred polar polymers are polyvinyl chloride, vinylidene chloride copolymers and vinyl alcohol/ethylene copolymers containing from approximately 15 to 35% by weight of ethylene.

It is to be understood that each of the constituent polymers of the multilayer structures according to the invention may contain the usual additives employed when this polymer is used, such as, for example, lubricants, plasticisers, heat stabilisers, light stabilisers, particulate or fibrous fillers, pigments, and the like. It is particularly advantageous to incorporate an ultraviolet stabiliser in the vinyl fluoride or vinylidene fluoride polymer or in the adhesive polymer in order to protect the polar polymer. Similarly, it may be advantageous to incorporate a small quantity, for example up to approximately 10% by weight, of adhesive polymer in the constituent polymers of the multilayer structures.

The method of producing the multilayer structures according to the invention is not critical. Use can thus be made of any of the usual methods of assembling polymer layers to produce the multilayer structures according to the invention. As an example of such a technique, mention may be made of hot gluing with the use of a solution of vinyl acetate polymer in a solvent or a mixture of suitable solvents. Solvents which are suitable for this assembly technique are, for example, aromatic hydrocarbons such as toluene, chlorinated hydrocarbons such as methylene chloride, ketones such as acetone and methyl ethyl ketone, ethers such as tetrahydrofuran and esters such as ethyl acetate and their mixtures. Preference is given, however, to ethyl acetate. In practice, hot gluing with the use of a solution of vinyl acetate polymer is carried out by coating cold, for example with the aid of a doctor blade, a film, a sheet or a plate made of a vinyl fluoride or vinylidene fluoride polymer (or of a polar polymer) with a solution of vinyl acetate polymer, drying the coating and hot-pressing the coated (precoated) film, sheet or plate onto a film, sheet or plate made of a polar polymer (or of a vinyl fluoride or vinylidene fluoride polymer).

The optimum hot gluing temperature and time will be evaluated experimentally in each particular case. They depend, in particular, on the nature of the polar polymer, the thickness of the assembled polymer layers and the additives employed which may be incorporated in the various polymers.

Other usual assembly techniques for the polymer layers which are suitable for producing the multilayer structures according to the invention are those in which the constituent polymers are employed at a temperature which is at least equal to their softening temperature, such as heat-lamination (hot-pressing of the polymer layers preformed, for example, by extrusion), coextrusion and coextrusion-lining.

The choice of one or other of these assembly techniques will be made as a function of the properties, particularly heat properties, of the polar polymer which is to be bonded to the vinyl fluoride or vinylidene fluoride polymer.

Polymeric multilayer structures which are preferred are those produced by assembling by hot gluing or by heat-lamination, by coextrusion or by coextrusion-lining and which incorporate three layers, in this case and in order a layer of vinyl fluoride or vinylidene fluoride polymer, a layer of vinyl acetate polymer and a layer of polar polymer, the latter being preferably chosen from polyvinyl chloride, vinylidene chloride copolymers and vinyl alcohol/ethylene copolymers containing approximately 15 to 35% by weight of ethylene.

The thickness of the constituent polymer layers of the multilayer structures according to the invention and the total thickness of the said structures are not critical and naturally depend on the use for which they are intended. The polymeric multilayer structures according to the invention may therefore be in the form of films, sheets, plates, pipes, hollow bodies, and the like.

The polymeric multilayer structures according to the invention may be advantageously employed in the form of films, sheets, plates, pipes or hollow bodies, in the areas of application requiring high chemical inertness, such as the chemical, pharmaceutical and food-processing industries, or a high resistance to ultraviolet rays, such as, for example, in the manufacture of agricultural or greenhouse films. As non-restrictive, practical examples of uses of multilayer complexes according to the invention, attention may be drawn to corrosion-resistant multilayer pipes incorporating a layer of rigid polyvinyl chloride, multilayer films and sheets for agriculture, incorporating a layer of polyvinyl chloride or polymethyl methacrylate, multilayer tarpaulins and sails incorporating a layer of polyurethane or polyethylene terephthalate, in which the layers consisting of the abovementioned polar polymers are bonded to a layer made of a vinyl fluoride or vinylidene fluoride polymer, and preferably of polyvinylidene fluoride, with the use of a vinyl acetate polymer.

The following examples illustrate the invention without, however, restricting it.

Example 1, according to the invention, relates to a three-layer coextruded tubular structure incorporating, in this order, a layer (A) made of a vinylidene fluoride homopolymer (thickness: 200 μm), a layer (B) made of a vinyl acetate/ethylene copolymer containing 88% by weight of vinyl acetate (thickness: 200 μm) and a layer (C) of flexible polyvinyl chloride (thickness: 540 μm).

Example 2, for reference, relates to a three-layer coextruded structure similar to that of Example 1, except that the adhesive polymer (layer B) is an ethylene/vinyl acetate copolymer containing 61% by weight of ethylene.

To manufacture the three-layer coextruded structures of Examples 1 and 2, three extruders (A) (B) (C) are arranged, feed a special coextrusion head. The displayed heating temperatures are, from the feed zone to the pumping zone respectively:

| | |
|---|---|
| 200° C.–210° C. | for extruder A |
| 90° C.–140° C. | for extruder B |
| 155° C.–165° C.–180° C.–180° C. | for extruder C |

The extruders A, B and C supply, respectively, the layers A, B and C of the coextruded structure.

Examples 3 and 4, according to the invention, relate to five-layer structures obtained by coextrusion-lining.

In Example 3, a two-layer coextruded structure manufactured using a flat die and consisting of a layer made of a vinylidene fluoride copolymer containing 5% by weight of monomer units derived from a fluoroolefin (average thickness: 800 μm) and a layer of vinyl acetate/ethylene copolymer containing 60% by weight of vinyl acetate (average thickness: 170 μm) is lined continuously at the exit of the abovementioned flat die and at a low pressure with a non-preheated three-layer structure consisting of a textile coated on both faces with flexible polyvinyl chloride (total thickness: 800 μm).

In Example 4 and according to the operational procedure described in Example 3, the two-layer coextruded structure of Example 3 is lined continuously with a non-preheated three-layer structure consisting of a textile coated on both faces with polyurethane elastomer (total thickness: 200 μm).

Collated in Table I are the results of the evaluation of adhesion, measured as the peel strength of the multilayer structures according to Examples 1 to 4. The peel strength is measured in a Frank type 650 tensometer using a method based on the ASTM standard D 1876-72.

Examples 5 to 12, according to the invention, relate to the hot gluing of a layer made of vinylidene fluoride homopolymer (film with a thickness of 100 μm) on a polar polymer layer with the use of a vinyl-acetate/ethylene copolymer containing 75% by weight of vinyl acetate, coated with polyvinyl chloride representing 7.5% by weight of the coated vinyl acetate copolymer.

Using a 150 μm wire spreader, the polyvinylidene fluoride film is coated with a solution of vinyl acetate copolymer at a concentration of 30% by weight in ethyl acetate, the coating is dried for 6 hours at ambient temperature, after which a second layer of vinyl acetate copolymer (as a solution at a concentration of 30% by weight in ethyl acetate) is applied under the same conditions, and the coating is dried for 24 hours at ambient temperature. The total thickness of the dry coating is 90 μm. The precoated polyvinylidene fluoride film is pressed hot onto a polar polymer layer for 20 minutes under a pressure of 46 kg/cm² in a Lafarge press maintained at 120° C., and then the complex is transferred to a cold press and held therein at ambient temperature for 10 minutes under the same pressure.

Example 13, for reference, relates to hot gluing of a layer made of vinylidene fluoride homopolymer (film with a thickness of 100 μm) on a layer of rigid polyvinyl chloride (film with a thickness of 200 μm) with the use of an ethylene/vinyl acetate copolymer containing 61% by weight of ethylene.

Using a 150 μm wire spreader, the polyvinylidene fluoride film is coated with a solution of ethylene copolymer at a concentration of 40% by weight in tetrahydrofuran, which is applied in two layers according to the operating procedure of Examples 5 to 12. The total thickness of the dry coating is 120 μm. The precoated polyvinylidene fluoride film is pressed in accordance with the operating procedure of Examples 5 to 12 onto the rigid polyvinyl chloride film.

The nature of the polar polymer and the thickness of the polar polymer layer employed in Examples 5 to 13, together with the results of the evaluation of the peel strength of the multilayer structures obtained by hot gluing in Examples 5 to 13, are collated in Table II.

TABLE I

| Example no. | Method of producing the multilayer structure | Polar polymer | Peel strength, newtons/cm |
|---|---|---|---|
| 1 | coextrusion | Flexible polyvinyl chloride | >10 |
| 2 | coextrusion | Flexible polyvinyl chloride | 3.77 |
| 3 | coextrusion lining | Flexible polyvinyl chloride | >10 |
| 4 | coextrusion lining | Polyurethane elastomer | 7.55 |

TABLE II

| Example no. | Polar polymer Nature | Layer thickness | Peel strength, newtons/cm |
|---|---|---|---|
| 5 | Vinyl alcohol/ethylene copolymer containing 20% by weight of ethylene | 50 μm | 12.50 |
| 6 | Polyethylene terephthalate | 50 μm | 15 |
| 7 | Nylon 6 | 30 μm | 8.93 |
| 8 | Vinylidene chloride/vinyl chloride copolymer | 20 μm | 12.40 |
| 9 | Rigid polyvinyl chloride | 200 μm | 21.90 |
| 10 | Polymethyl methacrylate | 4 mm | 19.45 |
| 11 | Polyurethane elastomer | 0.8 mm | 14.62 |
| 12 | Aromatic polycarbonate derived from bisphenol A | 4 mm | 15.00 |
| 13 | Rigid polyvinyl chloride | 200 μm | 4.74 |

We claim:
1. A polymeric multilayered structure, comprising:
a fluoropolymer layer comprised of one of a vinyl fluoride polymer and a vinylidene fluoride polymer;
a polar polymer layer comprised of a polar polymer;
a vinyl acetate polymer layer consisting essentially of a vinyl acetate polymer which is one of a homopolymer of vinyl acetate and copolymers of vinyl acetate and ethylene containing at least 50 percent by weight of vinyl acetate, and being interposed between said fluoropolymer layer and said polar polymer layer, whereby said fluoropolymer layer and said polar polymer layer are bonded together.

2. The polymeric multilayered structure according to claim 1, wherein the vinyl acetate polymer is a binary copolymer of vinyl acetate and ethylene containing from 60 to 90% by weight of vinyl acetate.

3. The polymeric multilayered structure according to claim 1, wherein the vinyl acetate polymer is coated with a thermoplastic polymer.

4. The polymeric multilayer structure according to claim 3, wherein said thermoplastic polymer is one of vinyl fluoride polymers, vinylidene fluoride polymers, and vinyl chloride polymers and is present in a proportion of at most about 10% by weight of the coated vinyl acetate polymer.

5. The polymeric multilayered structure according to claim 1, wherein said fluoropolymer layer is comprised of a vinylidene fluoride homopolymer.

6. The polymeric multilayered structure according to claim 1, wherein said fluoropolymer layer is comprised of a vinyl fluoride homopolymer.

7. The polymeric multilayered structure according to claim 1, wherein said polar polymer is selected from the group consisting of polyvinyl chloride, vinylidene chloride copolymers, vinyl alcohol/ethylene copolymers, polyethylene terephthalate, polymethyl methacrylate, aromatic polycarbonates derived from bisphenol A, nylon 6, nylon 66 and polyurethanes.

8. The polymeric multilayered structure according to claim 7, wherein said polar polymer is selected from the group consisting of polyvinyl chloride, vinylidene chloride copolymers and vinyl alcohol/ethylene copolymers containing from about 15 to 35% by weight of ethylene.

9. The polymeric multilayered structure according to claim 1, produced by assembling by hot gluing with the use of a solution of said vinyl acaetate polymer.

10. The polymeric multilayered structure according to claim 1, produced by assembling using one of heat lamination, coextrusion and coextrusion-lining.

11. A polymeric multilayered structure, comprising:
a fluoropolymer layer comprised of one of a vinyl fluoride polymer and a vinylidene fluoride polymer;
a polar polymer layer comprised of a polar polymer; and
a vinyl acetate polymer layer comprised of a vinyl acetate polymer which is a homopolymer of vinyl acetate, and interposed between said fluoroplymer layer and said polar polymer layer, whereby said fluoropolymer layer and said polymer layer are bonded together.

12. A polymeric multilayered structure, comprising:
a fluropolymer layer comprised of one of a vinyl fluoride polymer and a vinylidene fluoride polymer;
a polar polymer layer comprised of a polar polymer; and
a vinyl acetate polymer layer containing a vinyl acetate polymer which is one or more copolymer of vinyl acetate and ethylene and contains at least 50 percent by weight of vinyl acetate, and being interposed between said fluoropolymer layer and said polar polymer layer, whereby said fluoropolymer layer and said polymer layer are bonded together.

* * * * *